United States Patent
Kim et al.

(10) Patent No.: US 9,792,225 B2
(45) Date of Patent: Oct. 17, 2017

(54) HOST AND COMPUTER SYSTEM HAVING THE SAME

(71) Applicant: SAMSUNG ELECTRONICS CO., LTD., Suwon-si, Gyeonggi-do (KR)

(72) Inventors: Seok-Min Kim, Suwon-si (KR); Kwan-Ho Kim, Suwon-si (KR); Mi-Kyung Kim, Daejeon (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 294 days.

(21) Appl. No.: 14/748,606

(22) Filed: Jun. 24, 2015

(65) Prior Publication Data

US 2016/0085690 A1 Mar. 24, 2016

(30) Foreign Application Priority Data

Sep. 18, 2014 (KR) ........................ 10-2014-0124480

(51) Int. Cl.
*G06F 13/28* (2006.01)
*G06F 12/1081* (2016.01)
*G06F 12/0897* (2016.01)
*G06F 12/0891* (2016.01)

(52) U.S. Cl.
CPC ...... *G06F 12/1081* (2013.01); *G06F 12/0891* (2013.01); *G06F 12/0897* (2013.01); *G06F 13/28* (2013.01); *G06F 2212/205* (2013.01); *G06F 2212/2532* (2013.01); *G06F 2212/604* (2013.01)

(58) Field of Classification Search
None
See application file for complete search history.

(56) References Cited

U.S. PATENT DOCUMENTS

| | | | |
|---|---|---|---|
| 5,504,868 A | 4/1996 | Krakirian | |
| 6,490,657 B1 | 12/2002 | Masubuchi et al. | |
| 7,185,147 B2 * | 2/2007 | Illikkal | G06F 12/0835 711/118 |
| 8,281,042 B2 | 10/2012 | Son et al. | |
| 2002/0156992 A1 | 10/2002 | Yamana et al. | |
| 2005/0204058 A1 * | 9/2005 | Philbrick | H04L 29/06 709/238 |
| 2012/0254504 A1 | 10/2012 | Syu et al. | |
| 2013/0227219 A1 | 8/2013 | Ueki et al. | |

FOREIGN PATENT DOCUMENTS

| | | |
|---|---|---|
| JP | 2002-318687 | 10/2002 |
| KR | 1020100064673 | 6/2010 |

* cited by examiner

*Primary Examiner* — Idriss N Alrobaye
*Assistant Examiner* — Richard B Franklin
(74) *Attorney, Agent, or Firm* — F. Chau & Associates, LLC

(57) ABSTRACT

A host includes a cache including a plurality of cache lines, a command descriptor list configured to store a command transmitted from one of the plurality of cache lines, a host controller including a direct memory access (DMA) device that accesses the command descriptor list, and a processor configured to determine a size of the command descriptor list based on a size of the one of the plurality of cache lines.

20 Claims, 15 Drawing Sheets

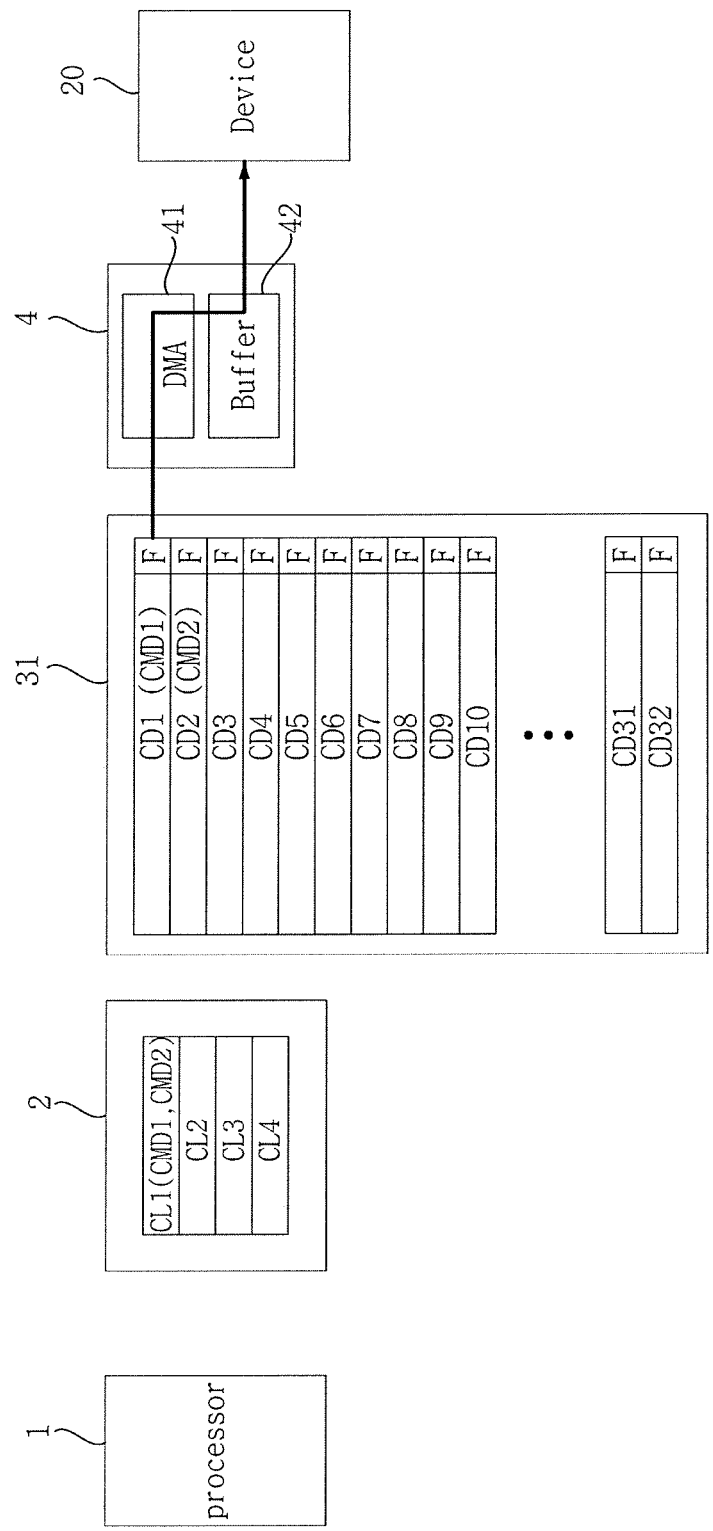

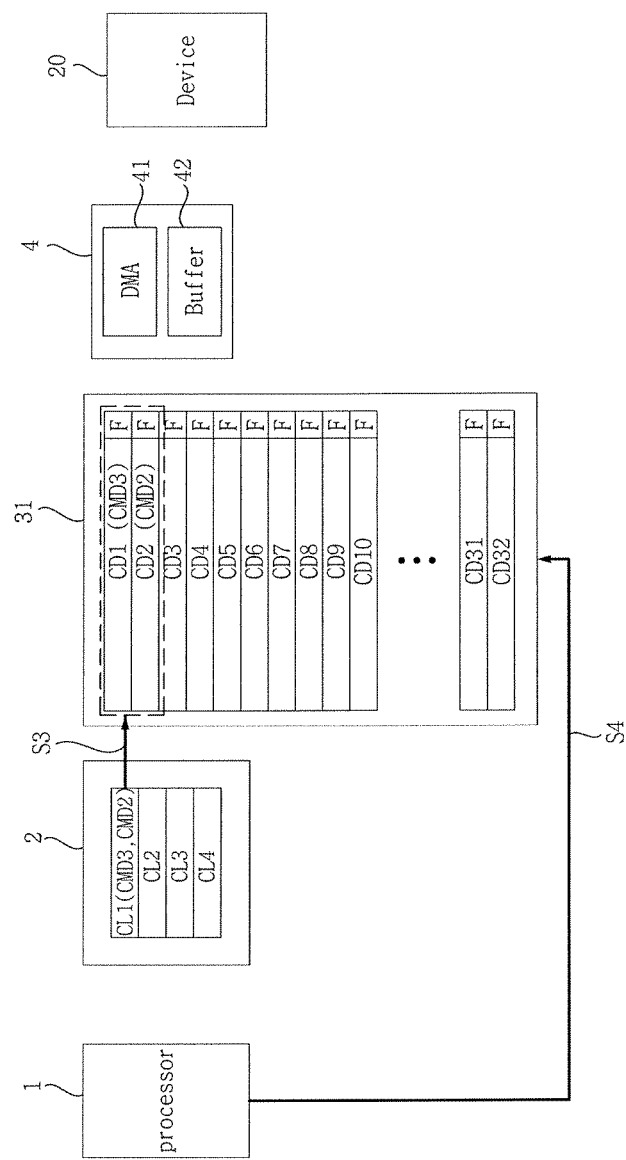

410

420

430

HOST AND COMPUTER SYSTEM HAVING THE SAME

CROSS-REFERENCE TO RELATED APPLICATIONS

This application claims priority under 35 U.S.C. §119 to Korean Patent Application No. 10-2014-0124480 filed on Sep. 18, 2014, the disclosure of which is incorporated by reference herein in its entirety.

TECHNICAL FIELD

Exemplary embodiments of the inventive concept relate to a universal flash storage (UFS) host, and more particularly, to a host including a processor which determines a size of a command descriptor based on a size of a cache line, and a computer system having the same.

DISCUSSION OF THE RELATED ART

A universal flash storage (UFS) host may include a host controller for controlling a UFS device. The UFS host may store a command in a command descriptor list.

The host controller may transmit a command from the command descriptor list to the UFS device. The UFS device may execute the received command and update the command descriptor list according to the executed result. Through the described above process, the UFS host may access the UFS device.

SUMMARY

Exemplary embodiments of the inventive concept provide a host controller which determines a size of an empty space in a command descriptor list based on a size of a cache line.

Exemplary embodiments further provide a computer system having the host controller.

According to an exemplary embodiment of the inventive concept, a host includes a cache configured to include a plurality of cache lines, a command descriptor list configured to store a command transmitted from one of the plurality of cache lines, a host controller configured to include a direct memory access (DMA) device for accessing the command descriptor list, and a processor configured to determine a size of the command descriptor list based on a size of the cache line.

In an exemplary embodiment, the command descriptor list may include at least one command descriptor for storing the command and at least one empty space, and a size of the cache line may be a summation of a size of the command descriptor and a size of the empty space.

In an exemplary embodiment, the host controller may include a buffer for transmitting the command to a device.

In an exemplary embodiment, the DMA device may transmit the command from the command descriptor list to the device through the buffer.

In an exemplary embodiment, the command descriptor list may include an update field and the command descriptor list may receive a response to the command from the device and update the update field.

In an exemplary embodiment, the processor may transmit the command to the command descriptor list through a cache flush or cache invalidate operation.

In an exemplary embodiment, the processor may transmit the command to the command descriptor list through the cache line.

In an exemplary embodiment, the host further may include a system memory including the command descriptor list.

According to an exemplary embodiment of the inventive concept, a computer system includes a device and a host configured to access the device. The host includes a cache configured to include a plurality of cache lines, a command descriptor list configured to store a command transmitted from one of the plurality of cache lines, a host controller configured to include a DMA device for accessing the command descriptor list, and a processor configured to determine a size of the command descriptor list based on a size of the cache line.

In an exemplary embodiment, the command descriptor list may include at least one command descriptor for storing the command and at least one empty space, and a size of the cache line may be a summation of a size of the command descriptor and a size of the empty space.

In an exemplary embodiment, the host controller may include a buffer for transmitting the command to the device, and the DMA device may transmit the command from the command descriptor list to the device through the buffer.

In an exemplary embodiment, the command descriptor list may include an update field, and the command descriptor list may receive a response to the command from the device and update the update field.

In an exemplary embodiment, the processor may transmit the command to the command descriptor list through a cache flush or cache invalidate operation.

In an exemplary embodiment, the host controller and the device may transmit and receive data according to a UFS interface.

In an exemplary embodiment, the host may include a universal flash storage (UFS) host, a Universal Serial Bus (USB) host, and a multimedia card (MMC) host, and the device may include a UFS device, a USB device, and an MMC device.

According to an exemplary embodiment of the inventive concept, a host includes a cache including a plurality of cache lines, a command descriptor list configured to store a command transmitted from one of the plurality of cache lines, a host controller including a direct memory access (DMA) device configured to access the command descriptor list, and a processor configured to determine a size of the command descriptor list based on a size of the one of the plurality of cache lines.

According to an exemplary embodiment of the inventive concept, a computer system includes a device and a host configured to access the device. The host includes a cache including a plurality of cache lines, a command descriptor list configured to store a command transmitted from one of the plurality of cache lines, a host controller including a direct memory access (DMA) device configured to access the command descriptor list, and a processor configured to determine a size of the command descriptor list based on a size of the one of the plurality of cache lines.

According to an exemplary embodiment of the inventive concept, a host includes a cache including a plurality of cache lines, and a command descriptor list configured to store commands transmitted from the plurality of cache lines. The command descriptor list includes a plurality of command descriptors and each of the plurality of command descriptors includes an empty space. The host further includes a host controller including a direct memory access (DMA) device configured to access the command descriptor list, and a processor configured to determine a size of the empty spaces based on a size of each of the plurality of cache lines.

BRIEF DESCRIPTION OF THE DRAWINGS

The above and other features of the present inventive concept will become more apparent by describing in detail exemplary embodiments thereof, with reference to the accompanying drawings, in which:

FIGS. 3A to 3G show a block diagram for describing an operation of the computer system shown in FIG. I according to an exemplary embodiment of the inventive concept.

DETAILED DESCRIPTION OF THE EXEMPLARY EMBODIMENTS

Figure 1:
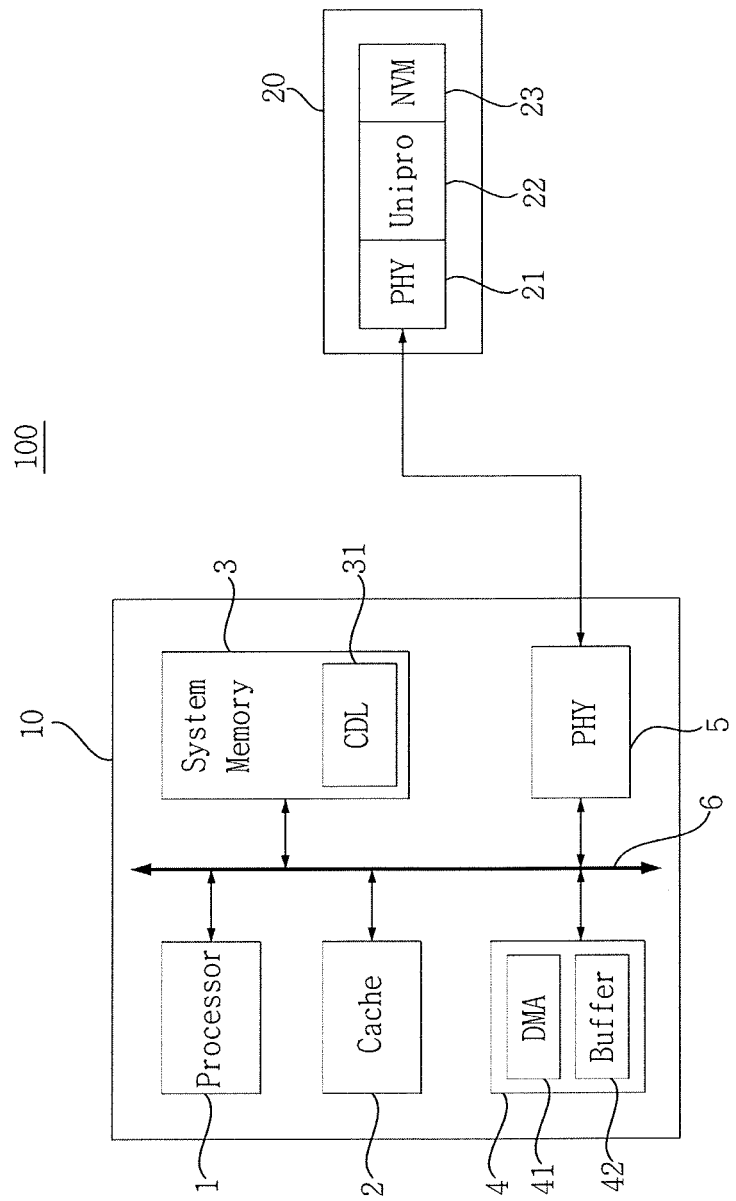
FIG. 1 is a block diagram illustrating a computer system according to an exemplary embodiment of the inventive concept.

Exemplary embodiments of the present inventive concept will be described more fully hereinafter with reference to the accompanying drawings. Like reference numerals may refer to like elements throughout the accompanying drawings.

It will be understood that, although the terms "first," "second," etc. may be used herein to describe various components, these components should not be limited by these terms. These terms are only used to distinguish one component from another component. Thus, a first component discussed below could be termed a second component and the second component discussed below could be termed the first component without departing from the teachings of the present inventive concept.

It will be understood that when an element or layer is referred to as being "on", "connected to", "coupled to", or "adjacent to" another element or layer, it can be directly on, connected, coupled, or adjacent to the other element or layer, or intervening elements or layers may be present. It will also be understood that when an element or layer is referred to as being "between" two elements or layers, it can be the only element or layer between the two elements or layers, or one or more intervening elements or layers may also be present.

Herein, when events are described as occurring at substantially the same time, it is to be understood that the events may occur at exactly the same time or at about the same time as would be understood by a person having ordinary skill in the art.

FIG. 1 is a block diagram illustrating a computer system according to an exemplary embodiment of the inventive concept.

Referring to FIG. 1, a computer system 100 may be, for example, a mobile device such as a mobile phone or a notebook computer, a personal computer, a server computer, a programmable home appliance, or a computer system having a general purpose or a specific purpose such as a mainframe computer.

The computer system 100 may include a host 10 and a device 20. In the exemplary embodiment shown in FIG. 1, the host 10 may include an application processor, and the device 20 may include a universal flash storage (UFS) card that is separate from the host 10.

The host 10 may include a processor 1, a cache 2, a system memory 3, a host controller 4, and a physical layer (PHY) 5. Each of the processor 1, the cache 2, the system memory 3, the host controller 4, and the physical layer PHY 5 communicate with each other through a system bus 6.

The processor 1 may control the overall computer system 100. The processor 1 may include, for example, an ARM™ processor. In an exemplary embodiment, the cache 2 may be connected between the processor 1 and the system memory 3, which may enhance performance of the computer system 100. The cache 2 may be implemented with, for example, a static random access memory (SRAM). The structure of the cache 2 is described in further detail with reference to FIGS. 3A to 3G.

The system memory 3 may store data for operating the processor 1. The system memory 3 may be implemented with, for example, a dynamic random access memory (DRAM).

The system memory 3 includes a command descriptor list 31. The processor 1 may allocate a memory space for generating the command descriptor list 31 in the system memory 3.

The command descriptor list 31 may store a command or a command descriptor, which are transmitted to the device 20. The command descriptor may include a command.

When the device 20 is a flash memory device according to a UFS specification, the command descriptor list 31 may be formed by 32 command descriptors with 32 bytes. Each of the 32 command descriptors may be an allocated memory area for storing a command transmitted from the cache 2. The command descriptor list 31 is described in further detail with reference to FIG. 2.

The host controller 4 may control the device 20. For example, the host controller 4 may control the device 20 to write data into the device 20. Moreover, the host controller 4 may control the device 20 to read data from the device 20. To implement the above described operations, the host controller 4 may include a direct memory access (DMA) device 41 and a buffer 42. The host PHY 5 may physically connect the host 10 to the device 20. An operation of the host controller is described in further detail with reference to FIGS. 3A to 3G.

The device 20 may include a device PHY 21, a UNIPRO interface 22, and a nonvolatile memory device 23. The device PHY 21 may physically connect the host 10 to the device 20. The UNIPRO interface 22 may interface the nonvolatile memory device 23 with the device PHY 21.

According to exemplary embodiments, each of the host 10 and the device 20 may be implemented with an independent chip.

Figure 2:
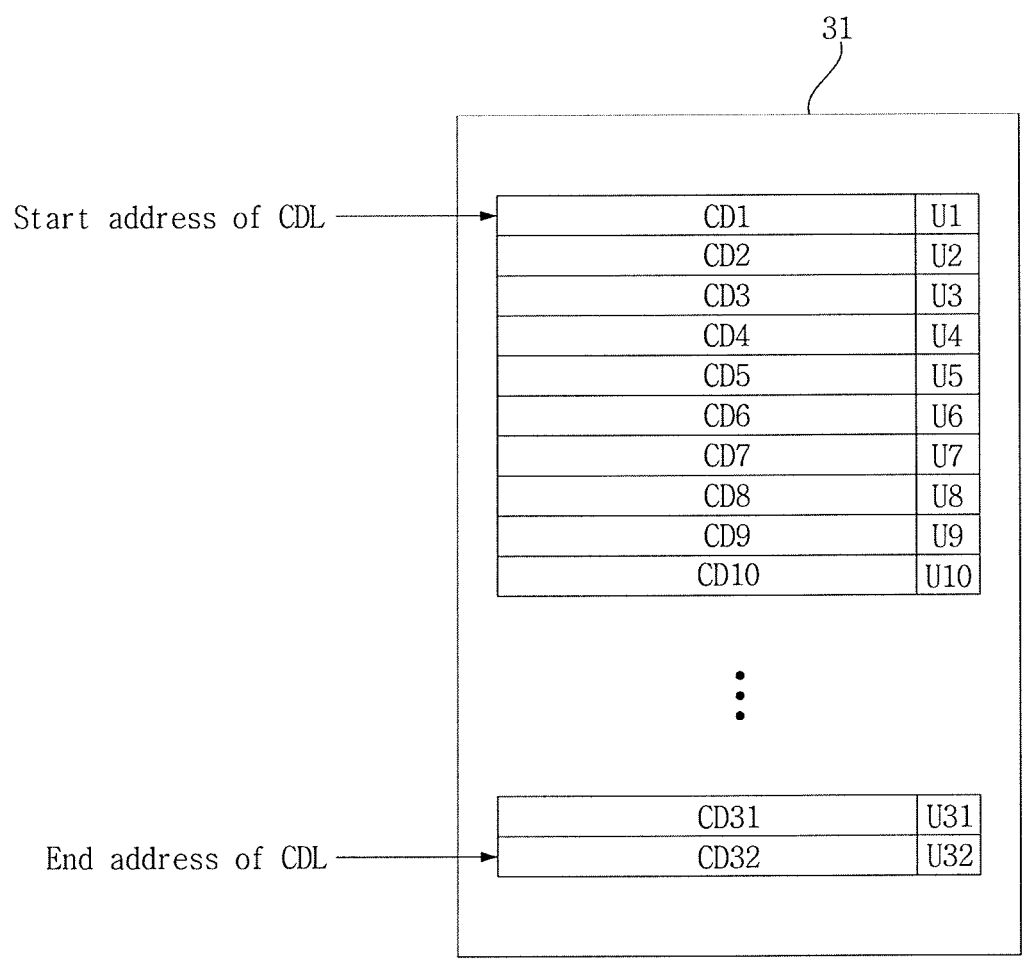
FIG. 2 is a block diagram illustrating a command descriptor list shown in FIG. 1 according to an exemplary embodiment of the inventive concept.

FIG. 2 is a block diagram illustrating a command descriptor list shown in FIG. 1 according to an exemplary embodiment of the inventive concept.

Referring to FIGS. 1 and 2, a command descriptor list 31 according to an exemplary embodiment of the inventive concept may include first to 32nd command descriptors CD1 to CD32. Each of the first to 32nd command descriptors CD1 to CD32 may be an allocated memory space which may store a command transmitted from the cache 2. Accordingly, each of the first to 32nd command descriptors CD1 to CD32 may store the command transmitted from the cache 2.

Moreover, each of the first to 32nd command descriptors CD1 to CD32 may include first to 32nd update fields U1 to U32.

When the host 10 is a UFS host, the device 20 is a UFS device. Here, a size of a command descriptor is formed by 32 bytes and the command descriptor list 31 may include the first to 32nd command descriptors CD1 to CD32 and the first to 32nd update fields U1 to U32.

Each of the first to 32nd command descriptors CD1 to CD32 may store a command, and each of the first to 32nd update fields U1 to U32 may store updated information.

Each of the first to 32nd update fields U1 to U32 may have "F" (e.g., a hex code) as a default. For example, when one of the first to 32nd update fields U1 to U32 is "F", a command descriptor corresponding to the update field having "F" denotes that the field has not yet updated. When the host controller 4 updates the first command descriptor CD1, the first update field U1 may have "0" denoting that the field has been updated.

The command descriptor list 31 may set the first command descriptor CD1 as a start address. For example, the first command may be stored in the first command descriptor CD1. Further, the command descriptor list 31 may set the 32nd command descriptor CD32 as an end address.

FIGS. 3A to 3G show a block diagram for describing an operation of the computer system shown in FIG. 1 according to an exemplary embodiment of the inventive concept.

Figure 3A:
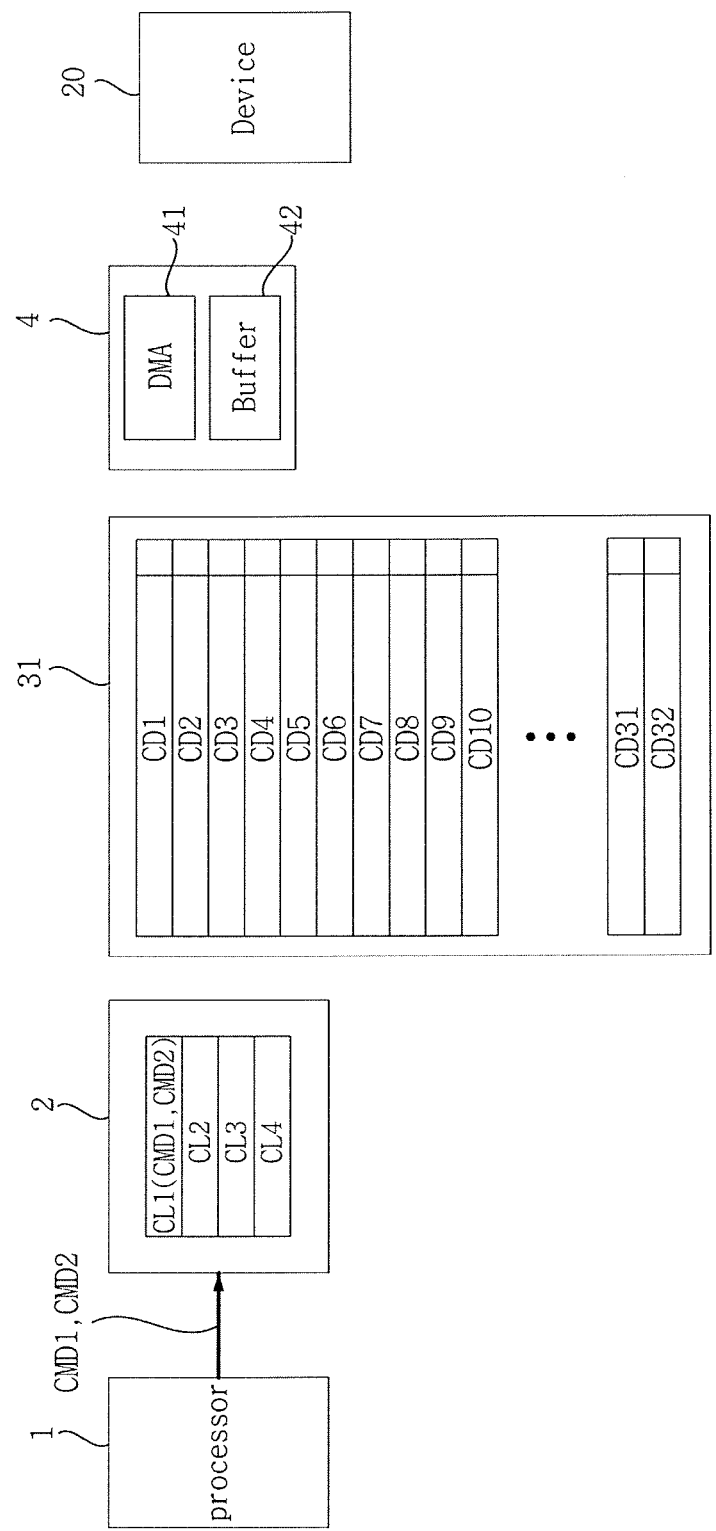

Referring to FIGS. 1 and 3A, a processor 1 may store a first command CMD1 and a second command CMD2 in a cache 2.

The cache 2 includes a plurality of cache lines. For example, the cache 2 may include first to fourth cache lines CL1 to CL4. One of the first to fourth cache lines CL1 to CL4 may store the first command CMD1 and the second command CMD2. For example, the first cache line CL1 may store the first command CMD1 and the second command CMD2.

Moreover, each of the first to fourth cache lines CL1 to CL4 may be formed by 64 bytes. When the first command descriptor CD1 is formed by 32 bytes, each of the first to fourth cache lines CL1 to CL4 may store two commands.

When each of the first to fourth cache lines CL1 to CL4 has 128 bytes and a command is formed by 32 bytes, each of the first to fourth cache lines CL1 to CL4 may store four commands.

Figure 3B:
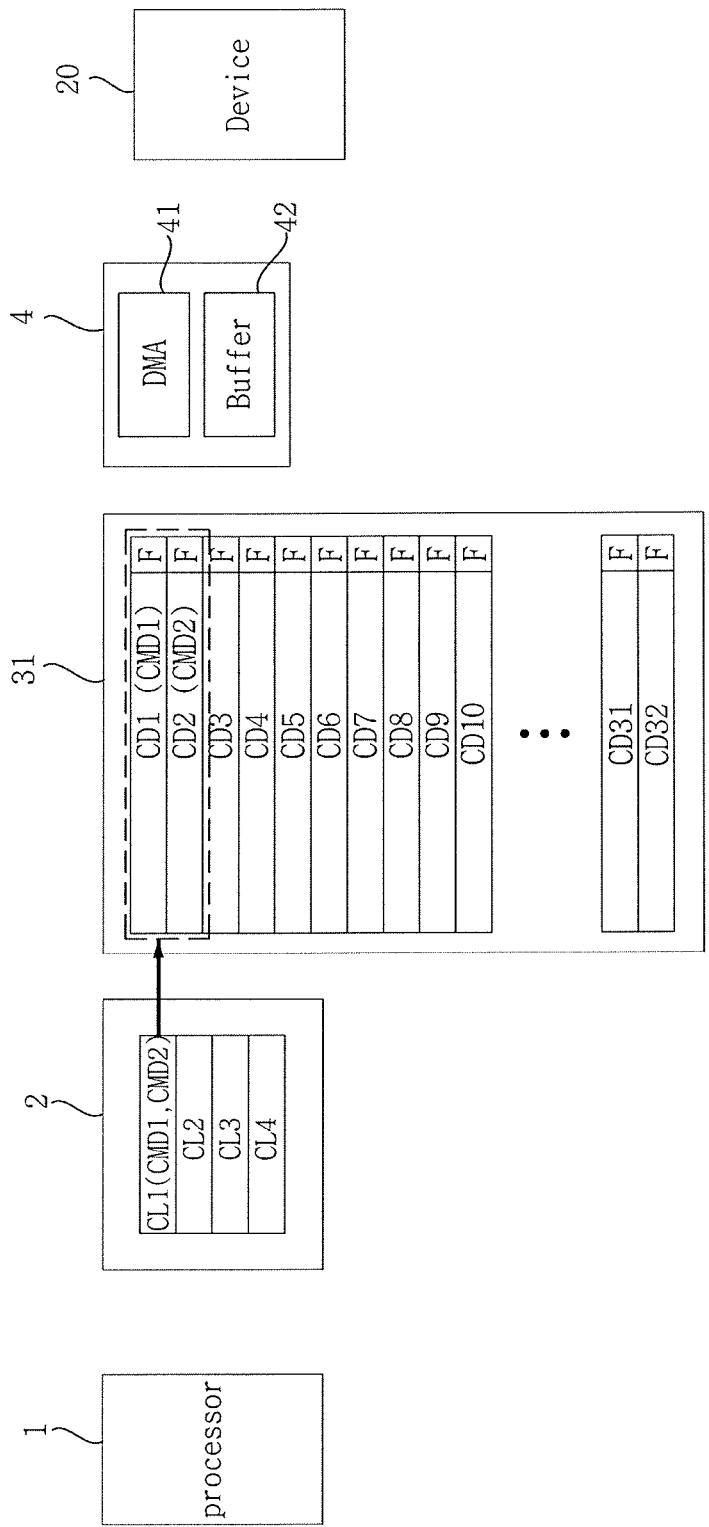

Referring to FIGS. 1 and 3B, one of the first to fourth cache lines CL1 to CL4 may store the first command CMD1 and the second command CMD2. Moreover, each of the first to fourth cache lines CL1 to CL4 may store a plurality of commands.

For example, the first cache line CL1 may store the first command CMD1 and the second command CMD2. The first cache line CL1 may transmit the first command CMD1 and the second command CMD2 to the system memory 3.

The processor 1 may transmit the commands stored in each of the first to fourth cache lines CL1 to CL4 using a cache flush operation or a cache invalidate operation.

The system memory 3 may include a command descriptor list 31. When the host 10 is a UFS host, the command descriptor list 31 may include first to 32nd command descriptors CD1 to CD32.

When each of the first and fourth cache lines CL1 to CL4 is formed by 64 bytes and a command is formed by 32 bytes, each of the first to fourth cache lines CL1 to CL4 may store two commands.

Here, each of the first and second command descriptors CD1 and CD2 may store commands stored in the first cache line CL1. Each of the third and fourth command descriptors CD3 and CD4 may store commands stored in the second cache line CL2. Each of the fifth and sixth command descriptors CD5 and CD6 may store commands stored in the third cache line CL3. Each of the seventh and eighth command descriptors CD7 and CD8 may store commands stored in the fourth cache line CL4.

The processor 1 may control the command descriptor list 31 to store the first command CMD1 stored in the first cache line CL1 in the first command descriptor CD1. The processor 1 may control the command descriptor list 31 to store the second command CMD2 stored in the first cache line CL1 in the second command descriptor CD2.

Referring to FIGS. 1 and 3C, the host controller 4 may transmit the first command CMD1 and the second command CMD2 from the command descriptor list 31 to the device 20.

For example, the DMA device 41 may transmit the first command CMD1 stored in the first command descriptor CD1 to the device 20 through the buffer 42. Moreover, the DMA device 41 may transmit the second command CMD2 stored in the second command descriptor CD2 to the device 20 through the buffer 42. The DMA device 41 may transmit the second command CMD2 stored in the second command descriptor CD2 to the device 20 through the buffer 42 before receiving a response corresponding to the first command CMD1.

Figure 3D:
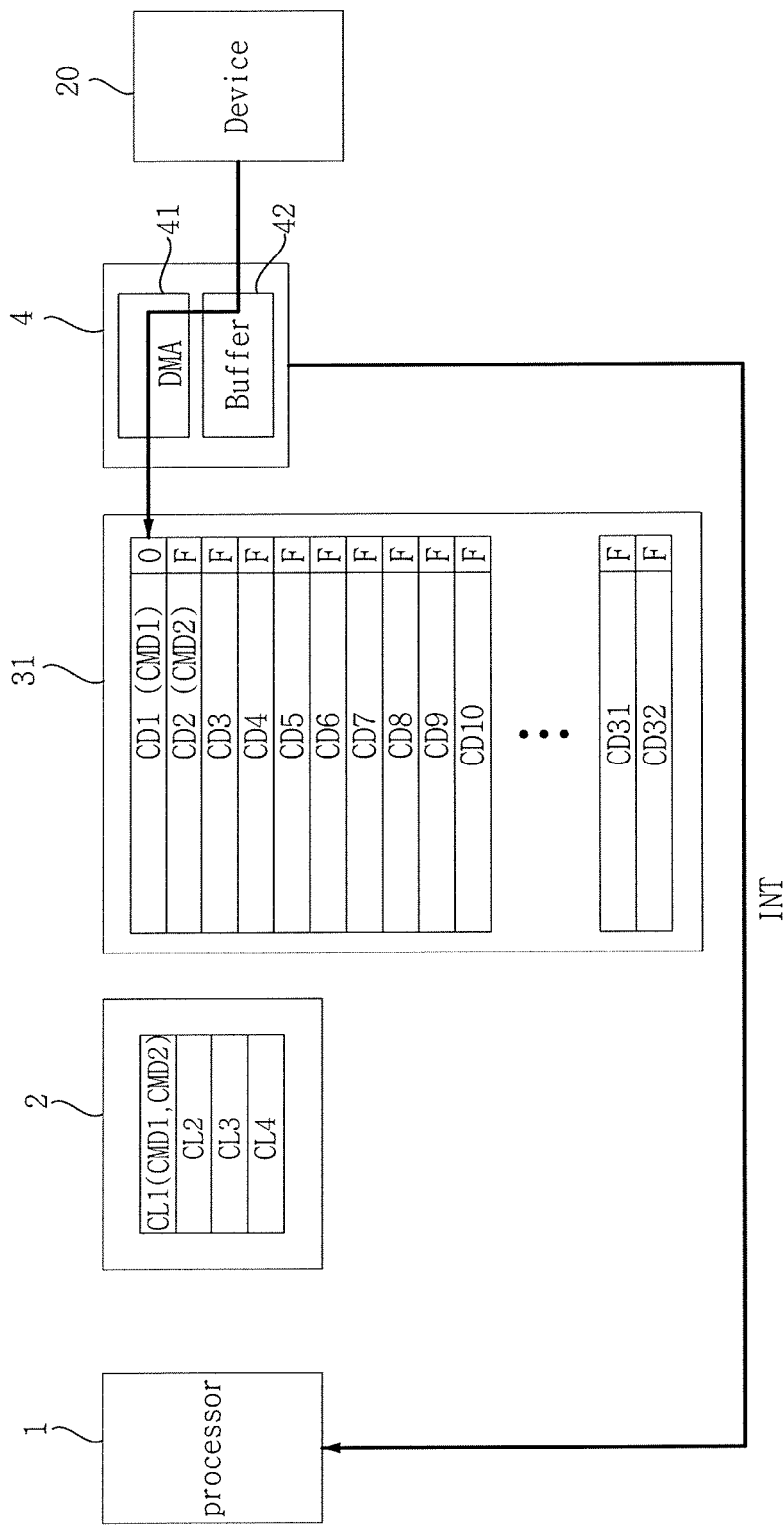

Referring to FIGS. 1 and 3D, each of the first to 32nd command descriptors CD1 to CD32 may include an update field U having updated information.

The update field U may have "F" as a default. A command descriptor in which the update field U has "F" may denote that the field has not yet updated. That is, the device 20 may not yet transmit a response to the command stored in the command descriptor in which the update field U has "F".

Moreover, when the host controller 4 updates the first command descriptor CD1, the first update field U1 may have "0". That is, when the device 20 transmits a response to the first command CMD1 to the DMA device 41, the DMA device 41 may write "0" to the first update field U1.

For example, the host controller 4 may update the first command descriptor CD1. Accordingly, the first update field U1 of the first command descriptor CD1 may have "0".

Further, the host controller 4 may update the first command descriptor CD1 and transmit an interrupt (INT) signal to the processor 1 at substantially the same time. In response to the INT signal, the processor 1 may identify that the first command descriptor CD1 is updated by using the first update field U1.

Figure 3E:
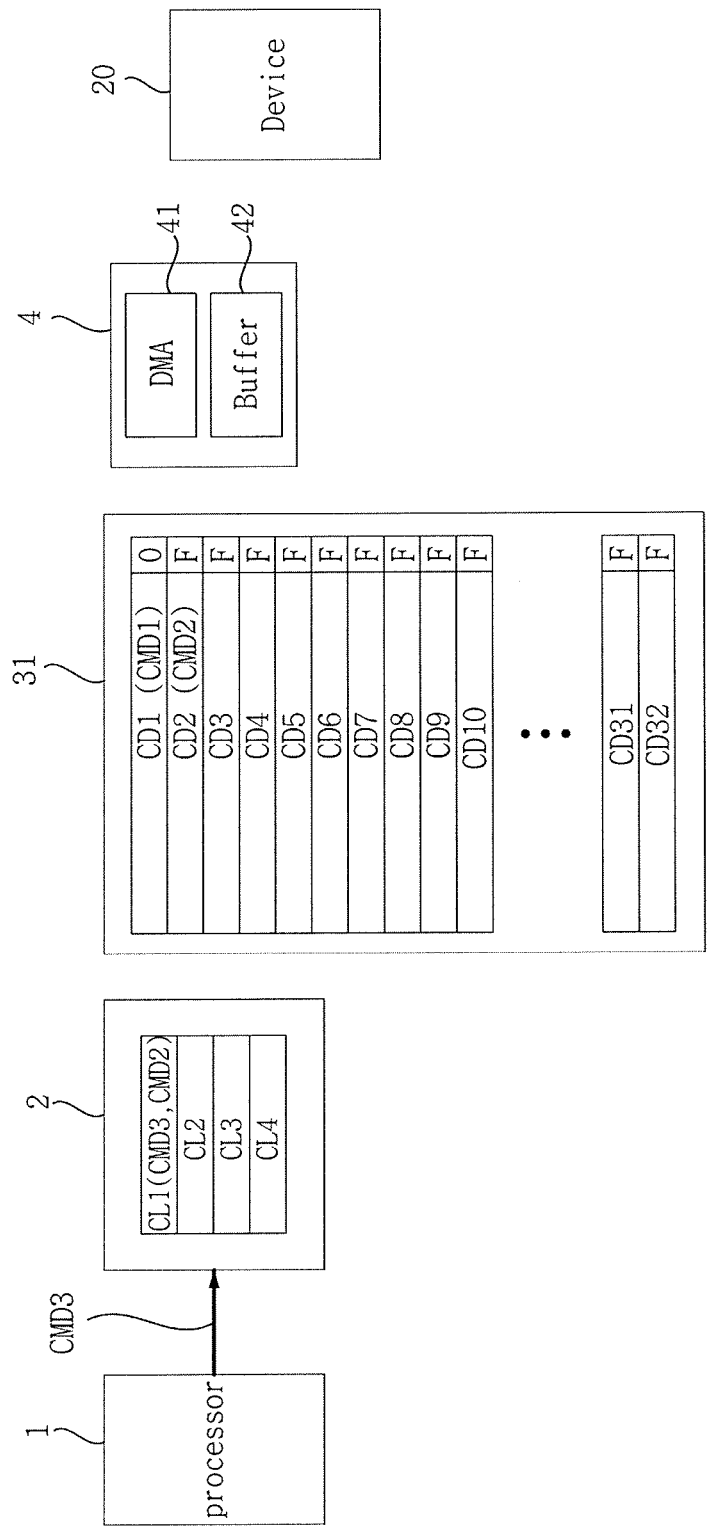

Referring to FIGS. 1 and 3E, the processor 1 determines whether the first update field U1 is updated. Moreover, the processor 1 generates a third command CMD3, which is a new command. The processor 1 may store the third command CMD3 in the first cache line CL1.

The first cache line CL1 may store the third command CMD3, which is a new command, and the second command CMD2, which is a previous command.

Figure 3F:
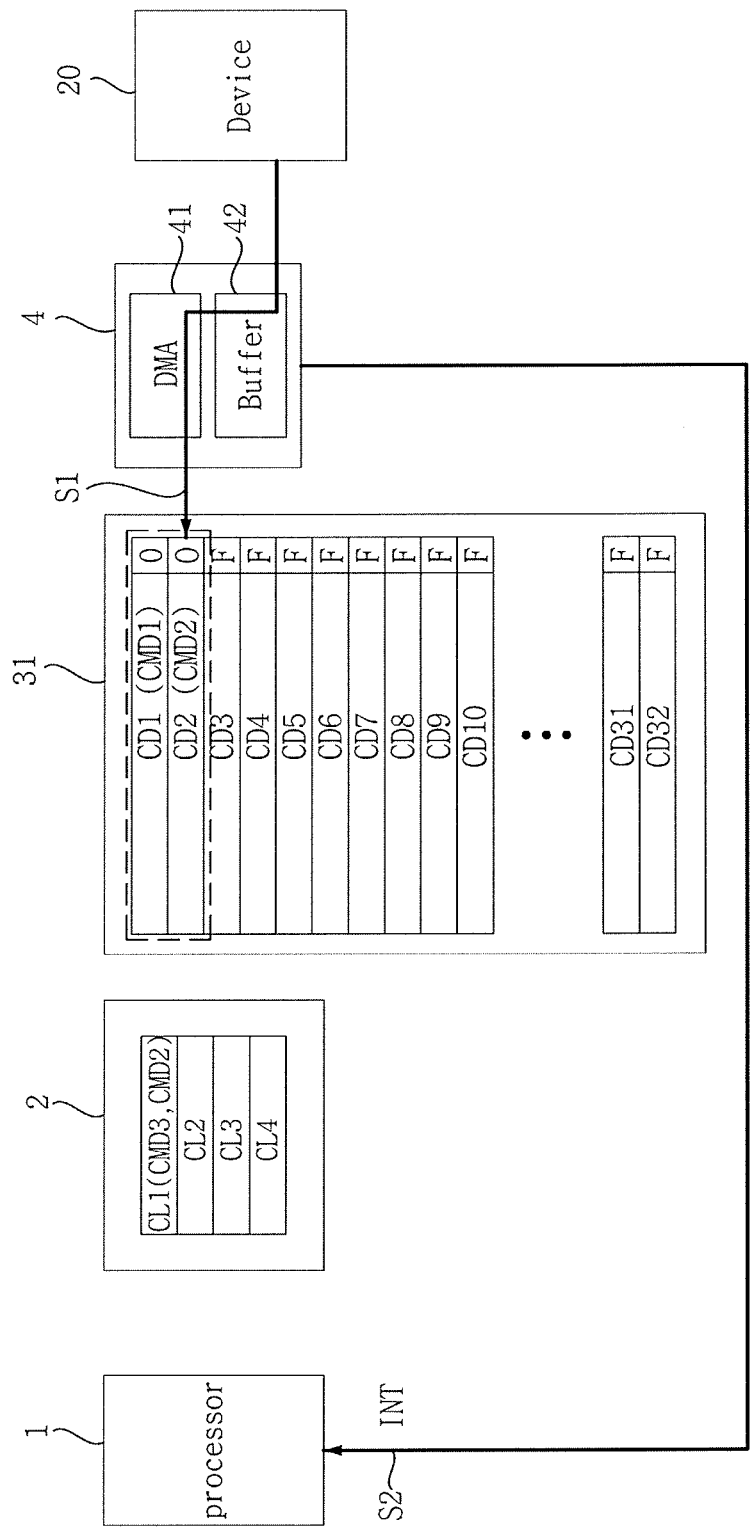

Referring to FIGS. 1 and 3F, the device 20 may transmit a response to the second command CMD2 to the host controller 4. After receiving the response to the second command CMD2, the host controller 4 updates the second update field U2 (S1). Here, the second update field U2 corresponding to the second command descriptor CD2 may be updated as "0".

At substantially the same time, the host controller 4 may transmit an INT signal to the processor 1 (S2).

Referring to FIGS. 1 and 3G, after the second command descriptor CD2 is updated, the processor 1 transmits the third command CMD3 stored in the first cache line CL2 to the first command descriptor CD1 using cache invalidate of the cache 2, and the processor 1 transmits the second command CMD2 stored in the first cache line CL2 to the second command descriptor CD2 using the cache invalidate of the cache 2 (S3). These transmissions may occur immediately after the second command descriptor CD2 is updated.

For example, the first command descriptor CD1 may store the third command CMD3, which is a new command. Here, the first update field U1 has "F". The second command descriptor CD2 may store the second command CMD2, which is a previous command. Here, the second update field U2 has "F".

In response to the INT signal, the processor 1 determines whether the second command descriptor CD2 is updated (S4). That is, the processor 1 determines whether the second command descriptor CD2 is updated through the second update field U2. Here, because the second update field U2 has "F", the processor 1 determines that the second command descriptor CD2 is not updated.

According to exemplary embodiments of the inventive concept, the host controller 4 may determine the size of an empty space in a command descriptor based on the size of the cache line, as described in further detail with reference to FIGS. 4 and 5. As a result, exemplary embodiments may provide a host device having improved performance including, for example, improved performance in scenarios in which the size of a cache line and the size of a command descriptor are different.

Figure 4:
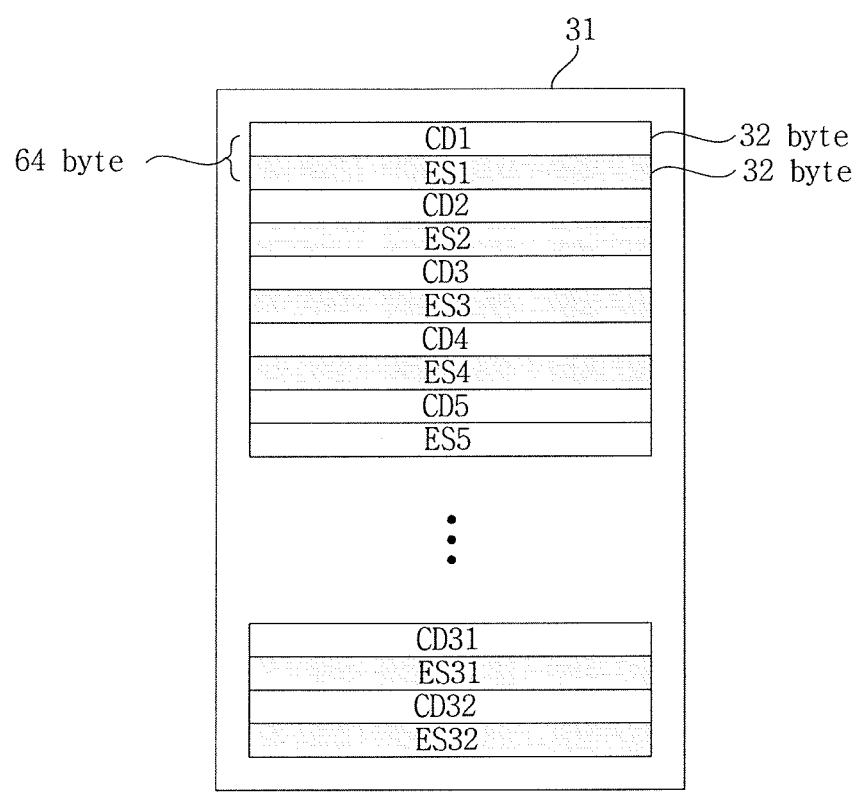
FIG. 4 is a block diagram illustrating a command descriptor list according to an exemplary embodiment of the inventive concept.

FIG. 4 is a block diagram illustrating a command descriptor list according to an exemplary embodiment of the inventive concept.

Referring to FIGS. 1 and 4, a command descriptor list 31 according to an exemplary embodiment of the inventive concept may include the first to 32nd command descriptors CD1 to CD32.

Moreover, each of the first to 32nd command descriptor CD1 to CD32 may include an empty space. For example, as shown in FIG. 4, the first command descriptor CD1 may include a first empty space ES1, the second command descriptor CD2 may include a second empty space ES2, etc.

A size of each of the first to 32nd empty spaces ES1 to ES32 may be determined based on a size of a cache line. For example, when a size of each of the first to fourth cache lines CL1 to CL4 shown in FIG. 3A is formed by 64 bytes and a size of each of the first to 32nd command descriptor CD1 to CD32 is formed by 32 bytes, a size of each of the first to 32nd empty spaces ES1 to ES32 may be set as 32 bytes.

Thus, according to exemplary embodiments, the summation of the size of the command descriptor and the size of the empty space may be a size of the cache line.

For example, the summation of the size of the first command descriptor CD1 and the size of the first empty space ES1 may be a size of the first cache line CL1.

Figure 5:
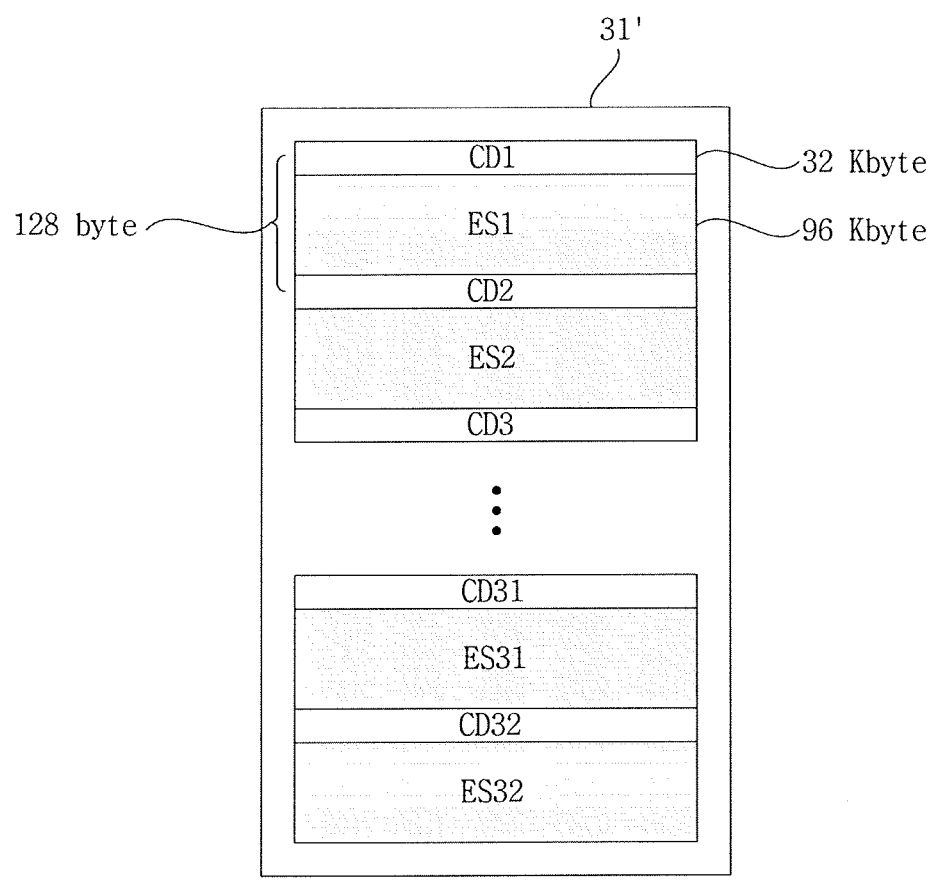
FIG. 5 is a block diagram illustrating a command descriptor list according to an exemplary embodiment of the inventive concept.

FIG. 5 is a block diagram illustrating a command descriptor list according to an exemplary embodiment of the inventive concept.

Referring to FIGS. 1 and 5, a command descriptor list 31' according to an exemplary embodiment of the inventive concept may include the first to 32nd command descriptors CD1 to CD32.

Moreover, each of the first to 32nd command descriptor CD1 to CD32 may include an empty space. For example, the first command descriptor CD1 may include a first empty space ES1, the second command descriptor CD2 may include a second empty space ES2, etc.

A size of each of the first to 32nd empty spaces ES1 to ES32 may be determined based on a size of a cache line. For example, when a size of each of the first to fourth cache lines CL1 to CL4 shown in FIG. 3A is formed by 128 bytes and a size of each of the first to 32nd command descriptor CD1 to CD32 is formed by 32 bytes, a size of each of the first to 32nd empty spaces ES1 to ES32 may be set as 96 bytes.

Thus, according to exemplary embodiments, the summation of the size of the command descriptor and the size of the empty space may be a size of the cache line.

Figure 6:
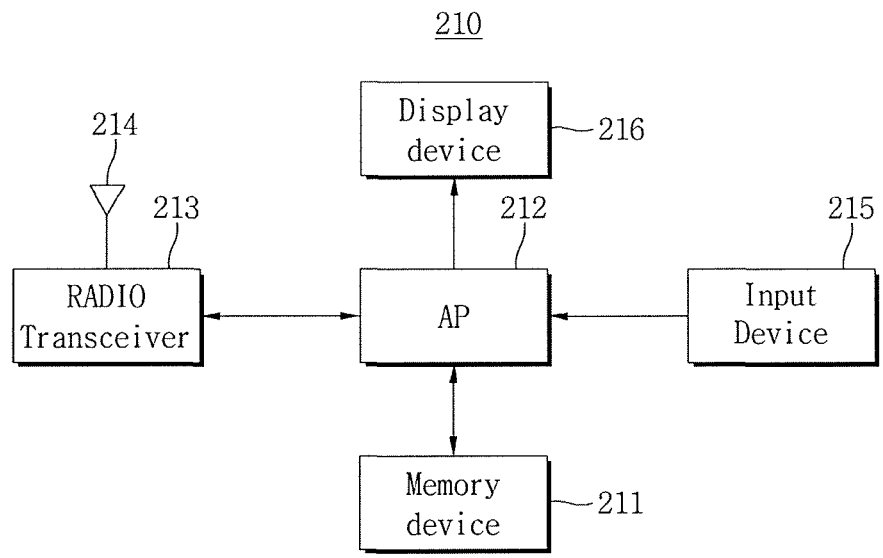
FIG. 6 is a block diagram illustrating a computer system including the host shown in FIG. 1 according to an exemplary embodiment of the inventive concept.

FIG. 6 is a block diagram illustrating a computer system 210 including the host shown in FIG. 1 according to an exemplary embodiment of the inventive concept.

Referring to FIG. 6, the computer system 210 may be, for example, a smartphone, a personal digital assistant (PDA), a portable multimedia player (PMP), an MP3 player, or an MP4 player.

The computer system 210 includes a memory device 211, an application processor (AP) 212 including a memory controller for controlling the memory device 211, a radio transceiver 213, an antenna 214, an input device 215, and a display device 216.

The radio transceiver 213 transmits and receives a radio signal through the antenna 214. For example, the radio transceiver 213 converts the radio signal received through the antenna 214 to a signal to be processed in the AP 212.

Accordingly, the AP 212 processes a signal output from the radio transceiver 213, and transmits the processed signal to the display device 216. Further, the radio transceiver 213 converts a signal output from the AP 212 to a radio signal, and outputs the converted radio signal to an external device through the antenna 214.

The input device 215 is a device for inputting a control signal for controlling an operation of the AP 212 or data processed by the AP 212. The input device 215 may be, for example, a pointing device such as a touchpad or a computer mouse, a keypad, or a keyboard.

In the exemplary embodiment shown in FIG. 6, the AP 212 may include the host 10 shown in FIG. 1.

Figure 7:
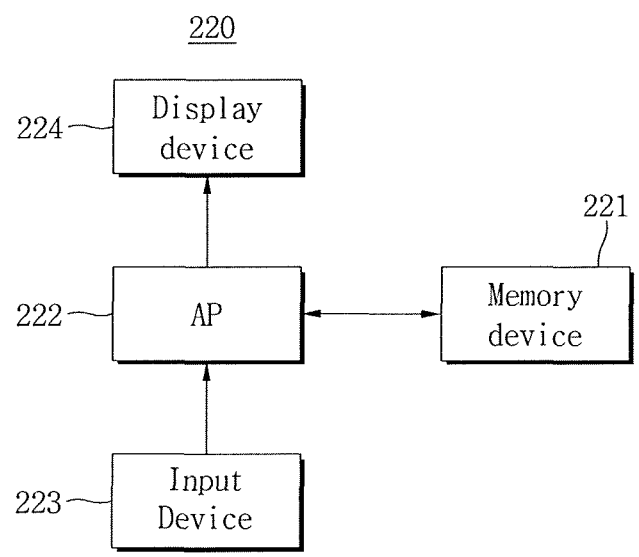
FIG. 7 is a block diagram illustrating a computer system including the host shown in FIG. 1 according to an exemplary embodiment of the inventive concept.

FIG. 7 is a block diagram illustrating a computer system 220 including the host shown in FIG. 1 according to an exemplary embodiment of the inventive concept.

Referring to FIG. 7, the computer system 220 may be, for example, a personal computer (PC), a network server, a tablet PC, a netbook, an e-reader, a PDA, a PMP, a MP3 player, or a MP4 player.

The computer system 220 includes a memory device 221, an AP 222 including a memory controller for controlling a data processing operation of the memory device 221, an input device 223, and a display device 224.

The input device 223 is a device for inputting a control signal for controlling an operation of the AP 222 or data processed by the AP 222, and may be, for example, a pointing device such as a touchpad or a computer mouse, a keypad, or a keyboard.

The AP 222 displays data stored in the memory device 221 through the display device 224 according to data input through the input device 223.

In the exemplary embodiment shown in FIG. 7, the AP 222 may include the host 10 shown in FIG. 1.

Figure 8:
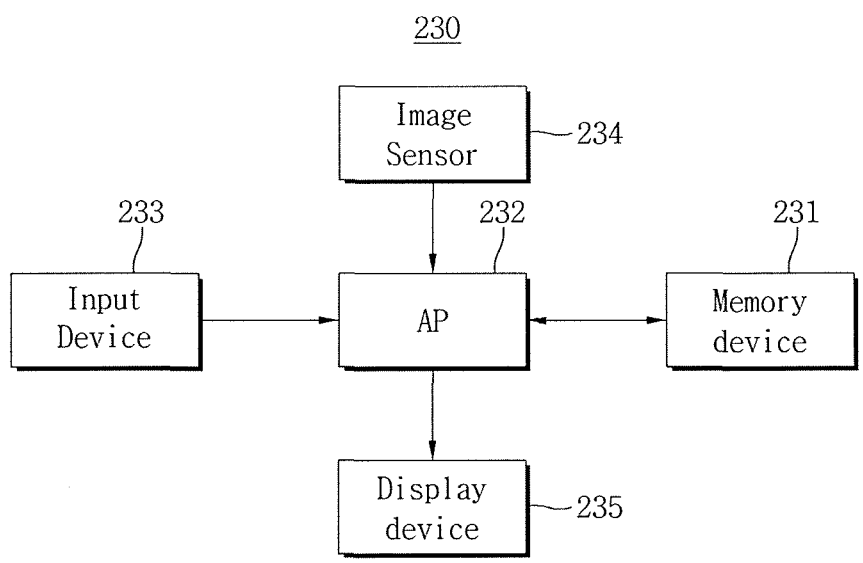
FIG. 8 is a block diagram illustrating a computer system including the host shown in FIG. 1 according to an exemplary embodiment of the inventive concept.

FIG. 8 is a block diagram illustrating a computer system 230 including the host shown in FIG. 1 according to an exemplary embodiment of the inventive concept.

Referring to FIG. 8, the computer system 230 may be an image processing device such as, for example, a digital camera, a mobile phone, a smartphone, or a tablet PC on which the digital camera is installed.

The computer system 230 includes a memory device 231, an AP 232 including a memory controller for controlling a data processing operation such as, for example, a write operation or a read operation of the memory device 231, an input device 233, an image sensor 234, and a display device 235.

The image sensor 234 converts an optical image to digital signals, and the converted digital signals are transmitted to the AP 232. Under the control of the AP 232, the converted digital signals are displayed on the display device 235 or stored in the memory device 231.

The AP 232 displays data stored in the memory device 231 using the display device 235.

The input device 233 is a device for inputting a control signal for controlling an operation of the AP 232 or data processed by the AP 232, and may be, for example, a pointing device such as a touchpad or a computer mouse, a keypad, or a keyboard.

In the exemplary embodiment shown in FIG. 8, the AP 232 may include the host 10 shown in FIG. 1.

Figure 9:
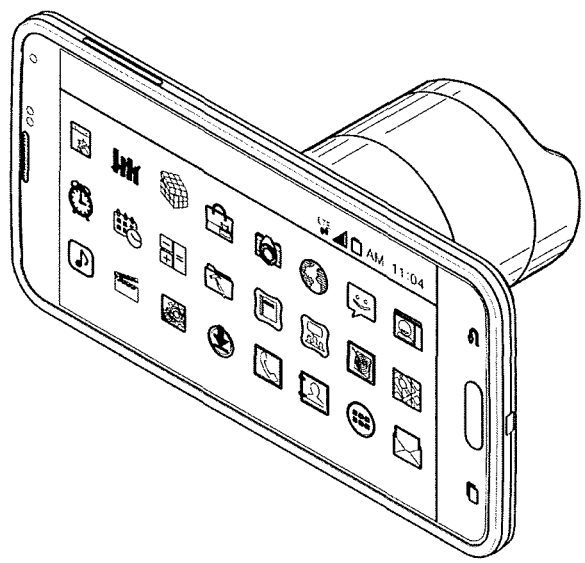
FIG. 9 illustrates a digital camera device including the host shown in FIG. 1 according to an exemplary embodiment of the inventive concept.

FIG. 9 illustrates a digital camera device 300 including the host shown in FIG. 1 according to an exemplary embodiment of the inventive concept.

Referring to FIG. 9, a digital camera device 300 operates using, for example, the Android™ operating system (OS). The digital camera device 300 may be, for example, a Galaxy Camera™ or Galaxy Camera2™.

The digital camera device 300 may include an image sensor which captures an image or a video and an AP which controls the image sensor.

In the exemplary embodiment shown in FIG. 9, the digital camera device 300 may include the host 10 shown in FIG. 1.

Figure 10A:
FIGS. 10A to 10C illustrate wearable devices including the host shown in FIG. 1 according to exemplary embodiments of the inventive concept.
Figure 10B:
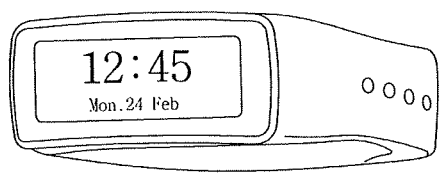
Figure 10C:
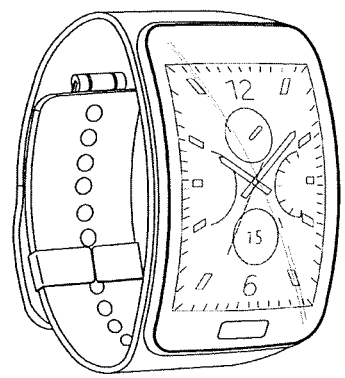

FIGS. 10A to 10C illustrate wearable devices including the host shown in FIG. 1 according to exemplary embodiments of the inventive concept.

Referring to FIGS. 10A to 10C, each of first to third wearable devices 410 to 430 is a type of a wrist watch. Each of the first to third wearable devices 410 to 430 operates using, for example, the Android™ OS or TIZEN™ OS.

The first wearable device 410 may include a Galaxy Gear2™, the second wearable device 420 may include a Galaxy Gear Fit™ and the third wearable device 430 may include a Galaxy Gear S™.

Each of the first to third wearable devices 410 to 430 may include an AP which operates with the Android™ OS or TIZEN™ OS, an image sensor which captures an image or a video, and a display device which displays the captured image or video.

In the exemplary embodiments shown in FIGS. 10A-10C, each of the first to third wearable devices 410 to 430 may include the host 10 shown in FIG. 1.

Figure 11:
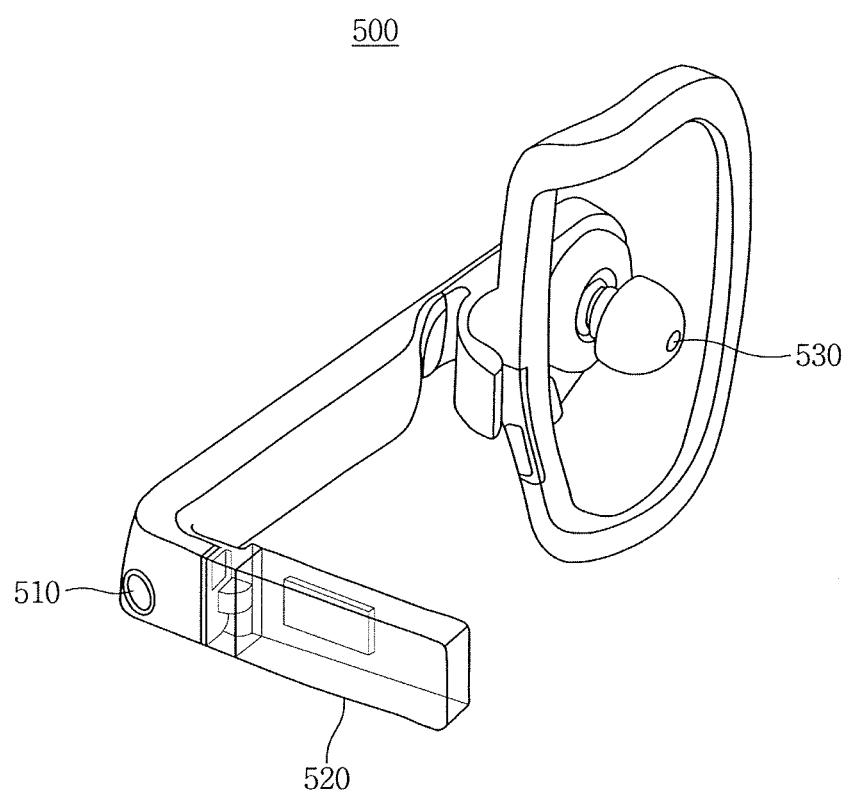
FIG. 11 illustrates a wearable device including the host shown in FIG. 1 according to an exemplary embodiment of the inventive concept.

FIG. 11 illustrates a wearable device including the host shown in FIG. 1 according to an exemplary embodiment of the inventive concept.

Referring to FIG. 11, the fourth wearable device 500 may be worn on an ear and provide sound and image information to a user. The fourth wearable device 500 operates using, for example, the Android™ OS or TIZEN™ OS. The fourth wearable device 500 may include a Galaxy Gear Blink™.

The fourth wearable device 500 may include an image sensor 510 that captures an image and a video, a display device 520 that displays the captured image and video, an earphone 530, and an AP that controls the fourth wearable devices 500.

In the exemplary embodiment shown in FIG. 11, the fourth wearable devices 500 may include the host 10 shown in FIG. 1.

The host according to exemplary embodiments of the inventive concept may determine a size of an empty space in a command descriptor list based on a size of a cache line.

Exemplary embodiments of the inventive concept can be applied to, for example, a mobile device or a wearable device including a system-on-chip (SoC).

While the present inventive concept has been particularly shown and described with reference to the exemplary embodiments thereof, it will be understood by those of ordinary skill in the art that various changes in form and detail may be made therein without departing from the spirit and scope of the present inventive concept as defined by the following claims.

What is claimed is:

1. A host, comprising:
   a cache comprising a plurality of cache lines;
   a command descriptor list configured to store a command transmitted from one of the plurality of cache lines;
   a host controller comprising a direct memory access (DMA) device configured to access the command descriptor list; and
   a processor configured to determine a size of the command descriptor list based on a size of the one of the plurality of cache lines.

2. The host of claim 1, wherein the command descriptor list comprises at least one command descriptor configured to store the command and at least one empty space, and the size of the one of the plurality of cache lines is equal to a summation of a size of the command descriptor and a size of the empty space.

3. The host of claim 1, wherein the host controller comprises a buffer configured to transmit the command to a device.

4. The host of claim 3, wherein the DMA device is configured to transmit the command from the command descriptor list to the device through the buffer.

5. The host of claim 4, wherein the command descriptor list comprises an update field, and the command descriptor list is configured to receive a response to the command from the device and update the update field.

6. The host of claim 1, wherein the processor is configured to transmit the command to the command descriptor list through a cache flush operation or a cache invalidate operation.

7. The host of claim 1, wherein the processor is configured to transmit the command to the command descriptor list through the one of the plurality of cache lines.

8. The host of claim 1, further comprising:
a system memory comprising the command descriptor list.

9. A computer system, comprising:
a device; and
a host configured to access the device,
wherein the host comprises:
a cache comprising a plurality of cache lines;
a command descriptor list configured to store a command transmitted from one of the plurality of cache lines;
a host controller comprising a direct memory access (DMA) device configured to access the command descriptor list; and
a processor configured to determine a size of the command descriptor list based on a size of the one of the plurality of cache lines.

10. The computer system of claim 9, wherein the command descriptor list comprises at least one command descriptor configured to store the command and at least one empty space, and the size of the one of the plurality of cache lines is equal to a summation of a size of the command descriptor and a size of the empty space.

11. The computer system of claim 9, wherein the host controller comprises a buffer configured to transmit the command to the device, and the DMA device is configured to transmit the command from the command descriptor list to the device through the buffer.

12. The computer system of claim 9, wherein the command descriptor list comprises a update field, and the command descriptor list is configured to receive a response to the command from the device and update the update field.

13. The computer system of claim 9, wherein the processor is configured to transmit the command to the command descriptor list through a cache flush operation or a cache invalidate operation.

14. The computer system of claim 9, wherein the host controller and the device are configured to transmit and receive data according to a universal flash storage (UFS) interface.

15. The computer system of claim 9, wherein the host comprises one of a universal flash storage (UFS) host, a Universal Serial Bus (USB) host, and a multimedia card (MMC) host, and the device comprises one of a UFS device, a USB device, and an MMC device.

16. A host, comprising:
a cache comprising a plurality of cache lines;
a command descriptor list configured to store commands transmitted from the plurality of cache lines,
wherein the command descriptor list comprises a plurality of command descriptors and each of the plurality of command descriptors comprises an empty space;
a host controller comprising a direct memory access (DMA) device configured to access the command descriptor list; and
a processor configured to determine a size of the empty spaces based on a size of each of the plurality of cache lines.

17. The host of claim 16, wherein the size of each of the plurality of cache lines is equal to a summation of a size of one of the plurality of command descriptors and the size of a corresponding empty space.

18. The host of claim 16, wherein the host controller comprises a buffer configured to transmit the commands to a device.

19. The host of claim 18, wherein the DMA device is configured to transmit the commands from the command descriptor list to the device through the buffer.

20. The host of claim 16, wherein the processor is configured to transmit the commands to the command descriptor list through the plurality of cache lines.

* * * * *